US008728198B2

(12) United States Patent
Morrow et al.

(10) Patent No.: US 8,728,198 B2
(45) Date of Patent: May 20, 2014

(54) METALS RECOVERY FROM MINING HEAP LEACH ORE

(71) Applicant: Applied Soil Water Technologies, LLC, Sparks, NV (US)

(72) Inventors: William K. Morrow, Troy, MI (US); Stephen A. Morrow, Reno, NV (US); Robert B. Valceschini, Reno, NV (US)

(73) Assignee: Applied Soil Water Technologies, LLC, Sparks, NV (US)

( * ) Notice: Subject to any disclaimer, the term of this patent is extended or adjusted under 35 U.S.C. 154(b) by 0 days.

(21) Appl. No.: 13/738,018

(22) Filed: Jan. 10, 2013

(65) Prior Publication Data
US 2013/0125709 A1    May 23, 2013

Related U.S. Application Data

(63) Continuation of application No. 12/673,228, filed as application No. PCT/US2008/073263 on Aug. 15, 2008, now abandoned.

(60) Provisional application No. 60/955,980, filed on Aug. 15, 2007.

(51) Int. Cl.
*C22B 11/00* (2006.01)

(52) U.S. Cl.
USPC .................. 75/744; 75/711; 423/27; 266/168

(58) Field of Classification Search
USPC ............ 266/168, 170; 75/711, 744, 743, 396, 75/398; 423/31, 27
See application file for complete search history.

(56) References Cited

U.S. PATENT DOCUMENTS

| | | | |
|---|---|---|---|
| 3,777,003 A | | 12/1973 | Mitterer |
| 3,885,017 A | * | 5/1975 | Robinson et al. .................. 423/1 |
| 3,958,947 A | * | 5/1976 | Robinson et al. ............. 422/261 |
| 4,039,405 A | * | 8/1977 | Wong ............................ 205/581 |
| 4,071,611 A | | 1/1978 | Chilson |
| 4,687,559 A | * | 8/1987 | Coburn et al. ................ 205/560 |
| 4,964,622 A | | 10/1990 | Sherman |
| 5,642,863 A | | 7/1997 | Patzelt et al. |
| 2007/0209481 A1 | * | 9/2007 | Pereira et al. ................... 75/743 |

OTHER PUBLICATIONS

International Search Report, International Application No. PCT/US2008/073263, Nov. 3, 2008.
Written Opinion of the International Searching Authority, International Application No. PCT/US2008/073263, Nov. 3, 2008.

\* cited by examiner

*Primary Examiner* — Scott Kastler
*Assistant Examiner* — Michael Aboagye
(74) *Attorney, Agent, or Firm* — Warner Norcross & Judd LLP (57) ABSTRACT

A method of recovering metal from heap leached ore is provided. The method includes supplying process fluid to a tank, distributing heap leached ore in the tank, optionally disrupting the flow of ore through the tank, creating a pregnant solution and discharging the process fluid, heap leached ore and pregnant solution from the tank to recover additional metal from the heap leached ore.

18 Claims, 3 Drawing Sheets

METALS RECOVERY FROM MINING HEAP LEACH ORE

BACKGROUND

The present invention relates generally to a metals recovery system. More specifically, the present invention relates to the methods and apparatus for recovery of metals from mined ore.

In heap leach mining operations, ore (pieces of mineral, rock, or soil that also bear a valuable metal) is placed on a containment liner system (also known as a heap leach pad) and continuously sprayed or irrigated with a process fluid to wet the entire ore heap. The process fluid extracts metals in the ore upon contact with the ore and carries the metal away in solution as the solution infiltrates through the ore heap. Process fluid carrying extracted metal is known as pregnant solution. The pregnant solution that infiltrates through the ore heap is collected at the bottom of the ore heap and transported to processing equipment for separating the metal and the process fluid.

As process fluid infiltrates through the ore heap, preferred flow channels or pathways may begin to form within the ore heap. Such preferred flow paths result in other areas of the ore heap no longer being contacted with process fluid that can carry away extracted or dissolved metals. Ore that has previously been wetted with process fluid but is not located along a preferred flow path will decrease in moisture content, below the ore material's field capacity, to the extent that free solution containing dissolved metal will no longer mobilize through the ore, leaving dissolved metal within the pore spaces of variable sized pieces of ore, adhered to the surface of the ore and/or absorbed within more porous or absorbent ore types. Furthermore, at the end of mining operations these heaps are drained down and a moisture content at approximately the field capacity of the various ore types within the heap will remain within the previously wetted ore material "trapping" dissolved metal in the heap. Due to the lack of a cost-effective method of removing this "trapped" metal, it usually remains within the heap at the close of mining operations and is considered "lost."

SUMMARY OF THE INVENTION

In one embodiment of the present invention there is provided a metals recovery system including a tank, a liquid delivery system for delivering a supply of process fluid to the tank, an ore delivery device for delivering a supply of ore to the tank and a liquid expulsion system for transporting pregnant solution out of the tank. The tank can include an agitation assembly for disrupting the flow path of the ore through the tank to encourage removal of metals from the ore and into solution. Although the metals recovery system is not limited in its application, some embodiments of the metals recovery system can be useful for removing trapped metal from spent ore heaps.

Some embodiments may further provide a method of recovering metal from ore including supplying a constant head pressure of process fluid to a tank, distributing ore into the tank, disrupting the flow of ore through the tank, discharging the ore and process fluid from the tank, transporting the ore and process fluid through a conduit while disrupting the flow of the ore and process fluid through the conduit, and discharging the ore and process fluid to subsequent processing apparatus.

These and other objects, advantages, and features of the invention will be more fully understood and appreciated by reference to the description of the current embodiment and the drawings.

BRIEF DESCRIPTION OF THE DRAWINGS

The preferred embodiment is shown in the accompanying drawings wherein.

DETAILED DESCRIPTION THE EMBODIMENTS

In the Figures of the instant application, like numerals indicate corresponding parts throughout the several views. It is to be understood that the embodiments described within are not exhaustive.

Figure 1:
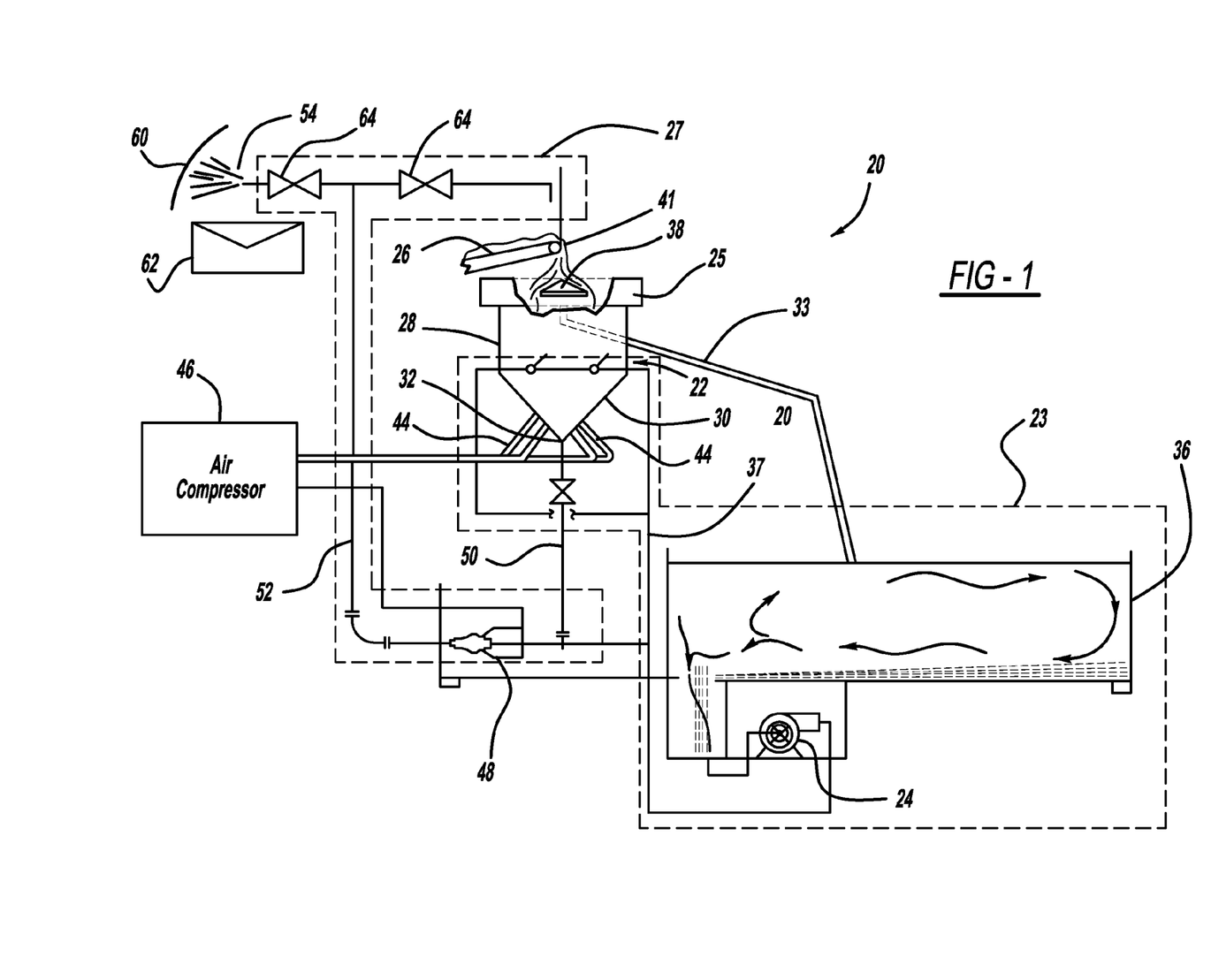
FIG. 1 is a schematic view of a metals recovery system according to an exemplary embodiment.

Referring to FIG. 1, a metals recovery system is shown at 20. The metals recovery system 20 generally includes at least one tank 22, a liquid delivery system 23, an ore delivery device 26 and a liquid expulsion system 27. In the basic operation of the metals recovery system 20, liquid delivery system 23 continuously or discontinuously supplies process fluid to the tank 22 to maintain a constant head pressure of process fluid in the tank 22. Ore is then added to the tank 22 via the ore delivery device 26. The ore is washed in the tank 22, thereby creating a pregnant solution of metals dissolved in the process fluid. The pregnant solution and ore exit the tank 22 at tank outlet 32 and enter the liquid expulsion system 27, which works to further wash the ore and transport the pregnant solution and ore to a processing apparatus. The processing apparatus including, but not limited to, a dewatering screen and other apparatus for removing the metals from the process fluid. The process apparatus may be the same tank 22, a different tank or separation equipment for separating the ore from the pregnant solution and the metal from the process fluid, such equipment is well known to those of skill in the art.

Figure 2:
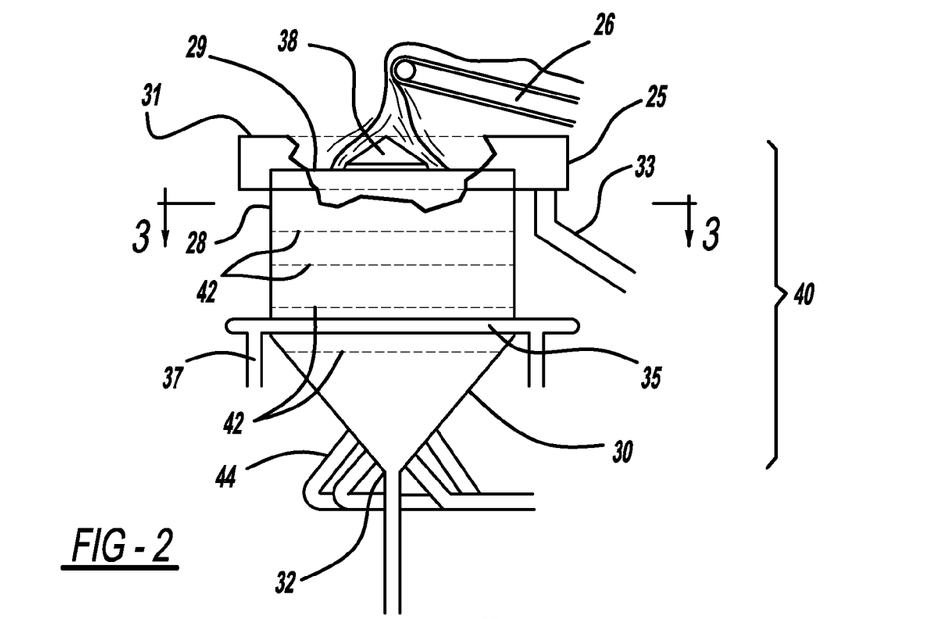
FIG. 2 is a perspective view of a tank for a metals recovery system according to the exemplary embodiment.

As shown in FIG. 2, the tank 22 includes a top portion 28 and a bottom portion 30, wherein the bottom portion 30 is generally tapered towards a tank outlet 32. In the embodiment illustrated in the Figures of the instant application, the top portion 28 has a cylindrical shape and the bottom portion 30 has a conical shape, with both the top portion 28 and bottom portion 30 centered alone the same axis. However, the shapes of the top portion and bottom portion of the tank are not limited. For example, the bottom portion 30 can be in any shape, such as a conical shape, that promotes the transport of ore and process fluid toward the tank outlet 32.

In the embodiment shown in the Figures, the tank 22 includes an overflow portion 25 surrounding a portion of the tank 22 proximate the rim 29 of the tank 22. The system 20 can also function appropriately without the overflow portion 25. When the upper portion 28 of the tank 22 has a cylindrical shape, the overflow portion 25 has a ring shape with an inner diameter about equal to the outer diameter of the top portion 28 of the tank 22 and an outer diameter larger than the outer diameter of the top portion 28 of the tank 22. In other words, the overflow portion 25 includes a hole through which the tank 22 passes and fits snugly during assembly. When the top portion 28 has a different shape than a cylinder, the hole in the overflow portion 25 conforms to the shape of the top portion 28. When positioned on the tank 22, the rim 31 of the overflow portion 25 is higher than the rim 29 of the tank 22. As noted earlier, process fluid is supplied to the tank 22 continuously or discontinuously to provide a constant head pressure in the tank 22. When the amount of process fluid entering the tank 22 exceeds the amount of process fluid leaving the tank 22 via the outlet 32, process fluid flows over the rim 29 and is collected in the overflow portion 25. In this manner, the tank 22 is always filled to the rim 29 and maintains a constant head pressure. The overflowing process fluid collected in the overflow portion 25 may be transported out of the overflow portion 25 via overflow portion outlet 33 so that the overflow portion 25 does not fill up with process fluid higher than the rim 29 of the tank 22. In one embodiment, the overflow portion outlet 33 may include a conduit that transports excess process fluid back to a process fluid source, such as a holding tank or a like, so that the process fluid may be reused in the process. Alternatively, the overflow portion can be a drain or return conduit positioned so that when the process fluid level gets too high, the process fluid can exit via the return conduit.

As shown in FIGS. 1 and 2, ore is delivered to the tank 22 via an ore delivery device 26. According to the illustrated embodiment, the ore delivery device 26 includes a conveyor belt. However, the ore delivery device 26 could alternatively include, for example, a front end loader, a slurry pump and pipeline, or simply a bull dozer for pushing ore directly into the tank 22.

As shown in FIGS. 1 and 2, the ore delivery device 26 is positioned over the center of the tank 22 and can thus deposit the ore directly into the tank 22. In the illustrated embodiment, a diffuser 38 is positioned between the ore delivery device 26 and the center of the tank 22. The diffuser 38 intercepts ore entering the tank 22 from the ore delivery device and distributes the ore into the tank 22. The distribution can be an even distribution of the ore into the tank 22 or can be an uneven distribution of the ore. According to the embodiment illustrated in FIGS. 1 and 2, the diffuser is a diffuser plate 41, examples of which are well known to those of skill in the art. The diffuser plate 41 can be conically shaped and is disposed centrally about the axis aligning the top portion 28 and bottom portion 30 of the tank 22. The ore delivered to the metal recovery system 20 via the ore delivery device 26 impacts the diffuser plate 41 to distribute the ore uniformly in an umbrella shape into the tank 22 or eliminated altogether. However, according to alternative embodiments, the diffuser 38 could be a screen or other device capable of spreading and distributing the ore into the tank 22. For example, the diffuser 38 can be a constant stream of solution that is projected upward to impact the ore entering the tank 22 such that the impact between the stream of solution and ore causes the ore to be distributed throughout the tank 22. Alternatively, or in addition, the ore could be delivered into the tank 22 at more than one location, such as by using multiple conveyer belts positioned about the circumference of the tank 22.

The process fluid used in the metals recovery system may be any liquid capable of washing the ore and causing the removal of metal from the ore and into the process fluid. Examples of such solutions are well known to those of skill in the art. One example of such a solution is water. As noted above, the ore that has already undergone heap leaching may have metal that has dried on the surface of the ore, and therefore only water is necessary to wash this metal from the surface of the ore. However, in other embodiments, the metals recovery system may use chemicals which can extract metals from the ore. For example, when attempting to extract gold or silver from ore, cyanide may be used as the process fluid. As another example, when attempting to extract copper or nickel, sulfuric acid may be used as the process fluid. These chemicals will serve not only to wash metals from the surface of the ore, but may also extract additional metals within the ore.

As shown in FIG. 1, the liquid delivery system 23 is used to store process fluid, deliver process fluid to tank 22 and receive overflow process fluid. In FIG. 1, the source of the process fluid is a holding tank 36. However, when the process fluid is water, the source of the process fluid may be, for example, a lake, pond, river or any other natural source of water. Pump 24 pumps process fluid from the source of the process fluid to the tank 22 via delivery piping 37. The pump 24 can be a mechanical pump or other system that forces the flow of process fluid into the tank 22. For example, the system can utilize pressure to force the flow of process fluid. The overflow outlet 33 runs from the overflow portion 25 back to the source of process fluid so that process fluid may be recycled.

Figure 3:
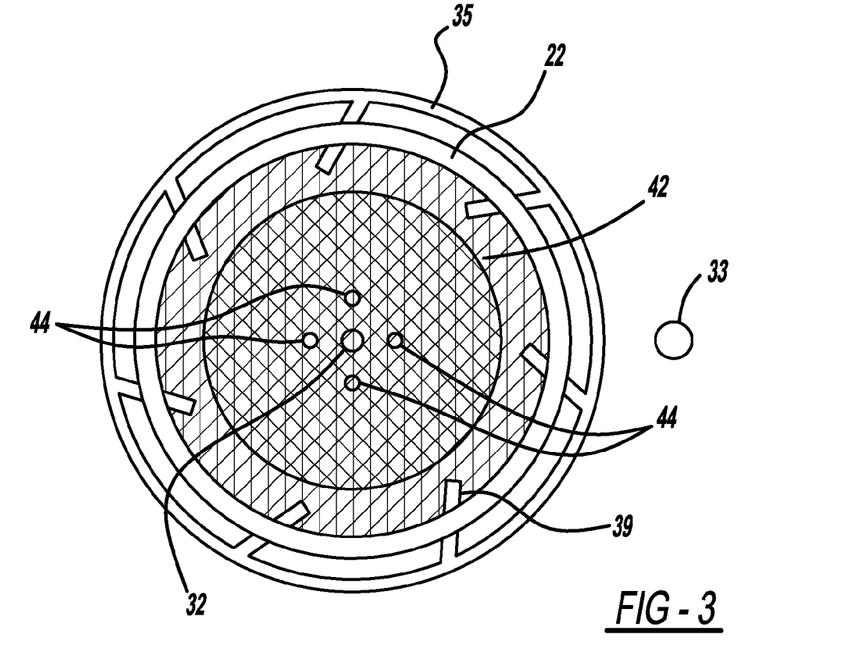
FIG. 3 is a cross sectional view of the tank taken along line 3-3 of FIG. 2.

As shown in FIGS. 2 and 3, delivery piping 37 running between the source of the process fluid and the tank 22 terminates at the tank 22 in the form of a piping circuit 35 that extends about the tank 22. In the embodiment illustrated, the piping circuit 35 extends around the circumference of the tank 22 at the bottom of the top portion 28 of the tank 22. The piping circuit 35 does not have to be circular in shape, but it may be desirable for the circuit 35 to completely surround the tank 22. The piping circuit 35 may surround the tank 22 at any portion of the tank 22, including higher up the top portion 28 (i.e., closer to the rim 29) or anywhere along the bottom portion 30. Furthermore, while the illustrated embodiment only shows one piping circuit 35 extending around the circumference of the tank 22, two or more piping circuits may be used to inject process fluid into the tank 22 at various positions about the tank 22. Alternatively, the delivery piping can inject the processing fluid directly into the tank 22 without a piping circuit.

As illustrated most clearly in FIG. 3, the piping circuit 35 of the illustrated embodiment includes a plurality of evenly spaced process fluid injection nozzles 39 for injecting process fluid into the tank 22. According to the embodiment illustrated in FIG. 3, each of the injection nozzles 39 protrude from the piping circuit 35 and enter the tank 22 at the same angle. As shown in FIG. 3, the angle at which the injection nozzles 39 enter the tank 22 is such that the injection nozzles 39 do not point directly at the center of the tank 22. When process fluid flows through the piping circuit 35 and enters the tank via 22 the plurality of injection nozzles 39, a whirlpool flow is created within the tank 22. That is to say, the direction at which the flow of process fluid enters the tank 22 will cause the process fluid within the tank 22 to move in a clockwise or counter-clockwise direction (depending on the angle of the injection nozzles 39). In this manner, ore deposited in the tank 22 via ore delivery system 26 and which travels down into the tank 22 due to the effect of gravity will also begin to flow in a clockwise or counterclockwise fashion, thereby preventing straight line transport of the ore through the tank 22 and increasing the residence time of the ore in the tank 22. Increased residence time will allow for additional washing of the ore and increased removal of metals from the ore.

The water inlet injection nozzles 39 may also be oriented such that each injection nozzle 39 points directly at the center of the tank 22. Alternatively, the water inlet injection nozzles 39 can be unevenly distributed and/or the injection angles can also be different, thereby creating additional disruption in the ore and providing additional washing of the ore within the tank 22.

With respect to vertical orientation, the injection nozzles 39 may be oriented such that the injection nozzles 39 are perpendicular to the side wall of the tank 22, tilted upwards towards the top of the tank 22, or tilted downwards towards the bottom of the tank 22. Different nozzles 39 may have different orientations. The pump 24 illustrated in FIG. 1 can be operated continuously or in bursts of any duration to provide process fluid to the tank 22 via the delivery piping 37, piping circuit 35 and injection nozzles 39 continuously or in bursts of any duration.

The tank 22 may also include an agitation assembly 40 for disrupting the flow path of the ore through tank 22 and thereby increasing the residence time of the ore in the tank 22. As described above with respect to increasing residence time by creating a whirlpool effect in the tank 22, the increased residence time caused by the agitation assembly 40 allows for more metal to be washed off the ore and enables more of the process fluid to impact the ore. As shown in FIGS. 2 and 3, the agitation assembly 40 includes a plurality of impact screens 42 extending horizontally within the tank 22 and spaced apart vertically from one another. While FIGS. 2 and 3 depict four impact 42 screens spaced throughout the tank 22, the agitation assembly 40 may include fewer or more than four impact screens. Additionally, while the impact screens 42 shown in FIGS. 2 and 3 are aligned perpendicular to the wall of the tank 22, the impact screens may also be tilted at various angles. Further, while the impact screens 42 are shown in FIGS. 2 and 3 to span the entire diameter of the tank 22, the impact screens 42 can span just a portion of the diameter of the tank.

The ore impacts the impact screens 42 as it flows downwardly through the tank 22, increasing residence time by slowing the transport of the ore from the top to the bottom of the tank 22. Furthermore, when the ore impacts the impact screens 42, metal on the ore may be shaken loose by the impact with the impact screen 42, thereby providing another mechanism by which metal may be removed from the ore.

The term "screen" as used herein is intended to include any meshlike sieve or grid-like device or perforated structure used to separate particles or objects. In the present invention, the device helps retain and prolong the exposure of the ore separate to the processing fluid. In one embodiment of the invention, the impact screens 42 each have a mesh of six inch by six inch squares. However, the mesh may be larger or smaller than six inch by six inch squares, and also may vary from screen to screen. In an alternate embodiment, the size of the mesh in each impact screen decreases from the upper most impact screen in the tank 22 (i.e., the impact screen closest to the rim 29) to the lowest impact screen in the tank 22. In this manner, there is a greater chance that every piece of ore flowing through the tank 22, regardless of size, will impact the impact screen 42.

In the embodiment illustrated in FIG. 3, adjacent impact screens 42 have unique mesh orientations to create a mesh interference pattern along the axis between the top and bottom of the tank 22. For example, the mesh orientations of adjacent impact screens 42 are rotated between about 30 to 60 degrees from one another about the central axis, although the degree or rotation between adjacent screens may be anywhere between 0 and 360 degrees, depending upon the shape of the openings. For example, for square openings, the degree of rotation can be between 1 and 89 degrees, whereas for rectangular shapes the degree of rotation can be greater. Providing each impact screen 42 with a unique mesh orientation within the tank 22 reduces the likelihood that the ore will follow a direct vertical path through the tank 22, and consequently increases the residence time of the ore within the tank 22. Alternatively, instead of altering the orientation of the impact screens, the impact screens can include differently shaped mesh patterns. For example, the mesh can be formed to have square through-holes in one screen, and triangularly shaped through-holes in a subsequent screen.

Alternatively or additionally, other agitation devices can be used. For example, a solid piece of material can also be used in place of the screen. In such an embodiment, the ore impacts the material, and maintains the ore in residence in the processing fluid. Then as the processing fluid flows past, the ore is gradually carried with the flow of the processing fluid.

As shown in FIG. 2, the agitation assembly 40 also may include a plurality of nozzles 44 in communication with an air compressor 46. While FIG. 2 illustrates four nozzles, the tank may have fewer or more than four nozzles. The nozzles 44 inject air into the tank 22 to create turbulence within the tank 22, which prolongs the amount of time that the ore remains in the tank 22. The turbulence may also further agitate the ore and thus shake metal free from the ore. In one embodiment, the nozzles 44 are disposed radially about the central axis in the tank 22 and pointed upwardly from the bottom of the tank 22, although other orientations may also be used. While FIG. 2 depicts the nozzles 44 located near the bottom of the tank 22, the nozzles 44 may also be located at other locations about the tank 22, such as along the top portion 28 of the tank 22. When placing nozzles 44 towards the bottom of the tank 22, the injected air may also help prevent the tank outlet 32 from clogging. The nozzles 44 may provide a continuous stream of air or bursts of air of any duration.

The ore and pregnant solution leave the tank 22 via the tank outlet 32. The tank outlet 32 is in communication with the liquid ejection system 27. As shown in FIG. 1, the liquid ejection system 27 generally includes first outlet piping 50, second outlet piping 52 and an air injector 48. The first outlet piping 50 and the second outlet piping 52 are both shown as being vertically oriented, parallel to each other, and are located substantially side-by-side. Alternatively, the first outlet piping 50 and the second outlet piping 52 can be otherwise oriented without departing from the spirit of the present invention. For example, the first and second outlet pipings can also be horizontally oriented. The orientation of the first and second pipings may be dictated by the subsequent process requirements, not by the method or device of the present invention. Therefore, those of skill in the art can determine the appropriate orientation based upon processing requirements.

The air injector 48 is located between the first outlet piping 50 and the second outlet piping 52 and is in communication with both the first outlet piping 50 and the second outlet piping 52.

The first outlet piping 50 is in communication with the tank outlet 32 of the tank 22 such that ore and pregnant solution leaving the tank 22 passes into the first outlet piping 50. As shown in FIG. 1, the first outlet piping 50 is vertically oriented. In this manner, ore and pregnant solution leaving the tank 22 travels down the first outlet piping 50 due to the force of gravity. The head pressure of the process fluid in the tank 22 also forces the ore and pregnant solution downwards through the first outlet piping 50. Additional washing of the ore may take place in the first outlet piping 50 due to the downward flow of the ore in the pregnant solution.

An air injector 48 is in communication with the end of the first outlet piping 50 opposite the end in communication with the tank 22. Ore and pregnant solution are passed through the air injector 48, at which point air is forced into the pregnant solution in the direction of flow through the liquid ejection system 27 (i.e., away from the tank). Adding air into the liquid ejection system 27 increases the velocity and force of the flow and increases the turbulence within the liquid ejection system 27 to further promote washing of the ore and the dislodging of metal from the ore. The air injector 48 may add air in a constant stream or in bursts of any duration. The air injector 48 may be in communication with the same air compressor 46 used by the nozzles 44 in the tank 22, although it should be appreciated that a separate source of compressed air could be used, if desired.

Between the tank outlet 32 and the air injector 48, the first outlet piping 50 may also be in communication with the same liquid delivery system 23 that delivers process fluid to the tank 22. In other words, the liquid delivery system 23 delivering process fluid to the tank 22 may branch off and communicate with the first outlet piping 50 such that process fluid is added to the first outlet piping 50 in the same direction of flow as the ore and pregnant solution (i.e., traveling away from the tank 22). The pump 24 of the liquid delivery system 23, or a separate pump, serves to pump process fluid from the source of process fluid into the first outlet piping 50. When added to the first outlet piping 50, the process fluid from the liquid delivery system 23 serves to increase the velocity and force of the flow of the pregnant solution and ore and cause turbulence within the first outlet piping 50 to further promote washing of the ore.

After the ore and pregnant solution have passed through the air injector 48, the ore and pregnant solution begin to move through the second outlet piping 52 in communication with the air injector 48. Several forces acting on the pregnant solution and ore, including air added by the air injector 48 in the direction of flow of the pregnant solution and ore, the head pressure of the process fluid in the tank 22 pushing down on the pregnant solution and ore in the ejection system 27 and the process fluid from the liquid delivery system 23 added to the first outlet piping 50 in the direction of flow of the pregnant solution and ore, may act on the pregnant solution and the ore to move the pregnant solution and ore through the second outlet piping 52. However, when the second outlet piping is vertically-oriented, as shown in FIG. 1, these forces must work against gravity, and ultimately a "sloshing" effect is created within the second outlet piping 52 as the pregnant solution and ore moving upwards falls back on itself. The ore is further washed by this "sloshing" effect, thereby further promoting the removal of metal from the ore. Additionally, the second outlet piping 52 may include nozzles (not shown) located along the length of the second outlet piping 52 to introduce air or process fluid into the second outlet piping 52 in the direction of flow of the pregnant solution and ore to further promote the upward movement of the ore and pregnant solution through the second outlet piping 52. The nozzles may provide continuous air or process fluid or bursts of air or process fluid and may be connected to the air compressor 46, the liquid delivery device system 23 or independent sources of air and process fluid.

The second outlet piping 52 may extend as high as needed to deliver the pregnant solution and ore to a next processing apparatus; this height can even be above the tank 22. The second outlet piping 52 may terminate at one of several locations. In a first possible location, the second outlet piping 52 terminates over the tank 22 so that the pregnant solution and ore are recycled through the same metals recovery system 20. In a second possible location, the second outlet piping 52 terminates over the tank of a subsequent metals recovery system (not shown) similar to the metals recovery system 20 but with different parameters. For example, the subsequent metals recovery system may include impact screens in the tank with smaller mesh areas than in the tank 22. In a third possible location, the second outlet piping 52 terminates at a discharge outlet 54 facing a deflector plate 60. In this embodiment, the second outlet piping 52 may turn from its vertical orientation to a substantially horizontal orientation facing a deflector plate 60. Because the pregnant solution and ore traveling through the liquid ejector system 27 are subjected to various forces which result in a high velocity flow, the pregnant solution will exit the discharge outlet 54 of the second outlet piping 52 in the form of a high velocity spray. The high velocity spray will be sprayed horizontally out of the second outlet piping 52, where it will impact the deflector plate 60. The deflector plate 60 slows the speed of the pregnant solution and ore exiting the second outlet piping 52 and deflects the pregnant solution and ore downwards towards a separation system 62. The separation system 62 may include, for example, a solid/liquid separator to separate the one from the pregnant solution and then a recovery system for recovering the metals from the pregnant solution. The ore separated in the solid/liquid separator and the process fluid separated from the metal may be recycled back to the metals recovery system 20.

It can be appreciated that once the ore and pregnant solution are separated, most of the metal that has been recovered from the ore and is dissolved into the solution. Therefore, the mass and volume of material to be treated for recovery of metal has been greatly reduced. Any number of processes known in the art can then be used to extract the metal from the solution, including the use of a cyclone, or simply keeping the solution still and waiting for the metal to fall out of the solution and become settled.

As shown in FIG. 1, the second outlet piping 52 may be designed to allow the pregnant solution and ore to be sent to either a deflector plate 60 and separation system 62 or back to a metals recovery system. In such an embodiment, the second outlet piping 52 branches in two directions, with one branch heading towards a deflector plate 60 and separation system 62 and another branch heading towards metals recovery system 20 or another metals recovery system. Each branch may include a valve 64, wherein closing the valve 64 to one branch forces the pregnant solution and ore to travel in the direction of the other branch. For example, when the operator of the metals recovery system 20 desires that the pregnant solution and ore be sent to the deflector plate 60 and separation system 62, the valve back to the tank 22 is closed, thereby forcing flow towards the deflector plate 60.

A method of recovering metals from heap leached ore is also provided. The method generally comprises supplying a tank with process fluid, distributing ore into the top of the tank, disrupting the flow of ore down through the tank, and evacuating ore and process fluid out of the tank from the bottom of the tank and into a processing apparatus. The method can also include the step of transporting the ore and process fluid through a conduit while disrupting the flow of the ore and process fluid through the conduit, and discharging the ore and process fluid to subsequent processing apparatus.

For convenience, the details of the method steps that correspond to descriptions already provided above with respect to the metals recovery system will not be repeated.

Figure 4:
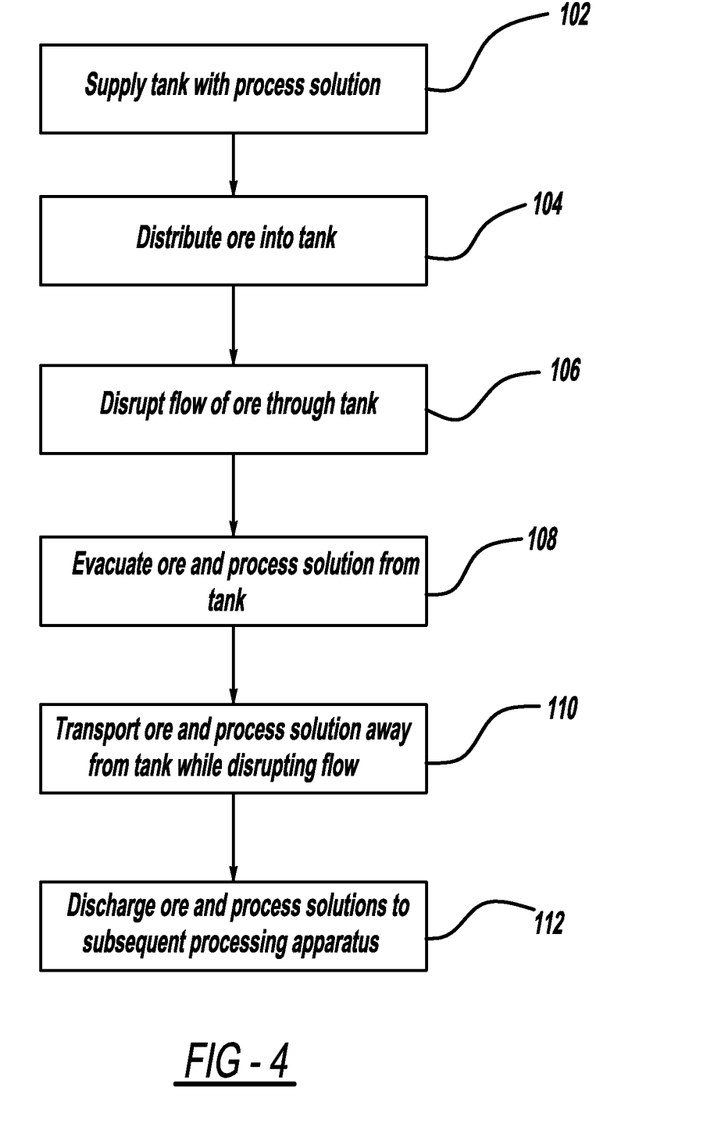
FIG. 4 is a flow chart according to an exemplary method of recovering metal from heap leached ore.

At step 102 the method includes supplying a tank with process fluid. The process fluid may be water, cyanide, sulfuric acid or any other suitable liquid capable of washing ore. The source of the process fluid supplied to the tank may be a holding tank of process fluid, a lake, a river, a pond, or other natural occurring body of water. In one embodiment, process fluid is supplied to the tank such that the containment vessel maintains a constant head pressure as described in greater detail above. Constant head pressure may be obtained by supplying more process fluid to the tank than is removed from the tank. Any overflow process fluid created by supplying more process fluid to the tank than is removed may be recycled back to the source of process fluid. In another embodiment, the process fluid is supplied to the tank in a manner which creates a whirlpool flow within the tank as described in greater detail above. Process fluid may be added to the tank at any location within the tank.

At step 104, ore is distributed into the top of the tank vessel filled with process fluid. In one embodiment, the ore is heap leached or spent ore, although fresh ore may also be used in the method. In another embodiment, the ore is evenly distributed to the tank. Such even distribution may be achieved by providing a diffuser plate over the tank and distributing the ore onto the diffuser plate. The diffuser plate can provide ore to different portions of the tank rather than in one location to thereby achieve even distribution. In still another embodiment, the ore may be distributed into the tank via a conveyor belt, although other distribution systems may also be used.

At step 106, the flow of ore down through the tank is disrupted. The ore is distributed into the tank at the top of the tank, and therefore the ore flows downwardly through the tank towards the bottom of the tank due to the effect of gravity. In one embodiment, the flow of the ore down through the tank is disrupted by the whirlpool flow created by the process fluid provided to the tank as described above. In another embodiment, an impact screen or a plurality of impact screens as described in greater detail above may be used to disrupt the flow of the ore down through the tank. In still another embodiment, nozzles injecting air into the tank may be used to create turbulent flow within the tank. The nozzles may be located anywhere throughout the tank. For example, the nozzles may be located at the bottom of the tank to both create turbulent flow and prevent clogging of a tank outlet. Turbulent flow disrupting the flow of the ore down through the tank may also be created by the use of stirring paddles located within the tank. None, one, several or all of these methods for disrupting flow of the ore down through the tank may be used.

At step 108, ore and pregnant solution are evacuated from the tank out of the bottom of the tank. Evacuation is accomplished via a tank outlet located at the bottom of the tank. The bottom of the tank may be tapered towards an outlet to ensure ore travels out of the tank rather than settle at the bottom of the tank.

At step 110, ore and pregnant solution are transported away from the tank, for example, through a conduit, while disrupting the flow of the pregnant solution and ore through the conduit. In one embodiment, the transport of the ore and pregnant solution through the conduit is achieved due to the orientation of the conduit. Generally vertically-oriented conduits located below the tank and into which the ore and pregnant solution flow after being evacuated from the tank will transport the ore and pregnant solution due to the effects of gravity and the head pressure of the process fluid in the tank. Alternatively, the conduit can be generally horizontally-oriented or otherwise oriented. Transport of the ore and pregnant solution may also be achieved by use of an air injector located along the conduit. The air injector forces air into the conduit in the same direction as the flow of the ore and pregnant solution (i.e., away from the tank) to push along the ore and pregnant solution and, in some instances, increase the velocity and form of the flow. Similarly, an additional flow of process fluid may be injected anywhere along the conduit to force along the flow of the ore and pregnant solution and, in some instance, increase the velocity and force of the flow. The air injector and added flow of process fluid may also be responsible for disrupting the flow of the pregnant solution and ore through the conduit due to the turbulence caused by their addition. In another embodiment, flow is disrupted by transporting the ore and pregnant solution in a vertically upwards direction. Vertically-oriented conduit parallel to and in communication with the vertically-oriented conduit located under the tank requires that pregnant solution and ore travel upwards, which is accomplished by, for example, the air injector, the injection of process fluid and the head pressure of the process fluid in the tank. While these forces act to transport the pregnant solution and ore upwards, the force of gravity pushes back down on the pregnant solution and ore, thereby creating a "sloshing" effect which disrupts the flow of the pregnant solution and ore and promotes washing of the ore.

At step 112, the pregnant solution and ore is discharged to subsequent processing apparatus. In one embodiment, subsequent processing apparatus is the tank into which the ore and process fluid are first supplied. In this manner, the ore undergoes another cycle of the method for washing metal off of ore. In this embodiment, the pregnant solution and the ore may be discharged over the distribution plate discussed above in order to ensure even distribution of the ore. In another embodiment, subsequent processing apparatus is a tank similar to the tank described above, but with different parameters, such as the size of the mesh in impact screens or the location and number of nozzles injecting air into the tank. In still another embodiment, subsequent processing apparatus is separation equipment and optionally a deflector plate. In this embodiment, the ore and pregnant solution is discharged horizontally towards a deflector plate. Due to the force and velocity of the flow of the ore and pregnant solution, the ore and pregnant solution discharge as a high velocity, high force spray. The spray contacts the deflector plate, which slows down the pregnant solution and ore and directs the ore and pregnant solution downwards towards separation equipment. The separation equipment may be, for example, a liquid/solid separator to separate the ore from the pregnant solution and a recovery system for recovering metal dissolved in the pregnant solution. Both the separated ore and the separated process fluid may be recycled back to the tank.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method of recovering metals from previously heap leached ore, the method comprising:
 providing a supply of previously heap leached ore containing moisture, the ore having been previously leached in an ore heap with a first process fluid so that a substantial portion of dissolved metals in the ore is removed from the ore, but a remaining portion of dissolved metal remains trapped in the ore;
 providing a tank having a top portion and a bottom portion, wherein the top portion has an inlet and the bottom portion has an outlet;
 delivering a second process fluid to the tank, the second process fluid being water adapted to remove at least a portion of the remaining portion of dissolved metal trapped in the heap leached ore, the water being substantially void of ore, the water being introduced into the tank distal from the outlet of the bottom portion of the tank;

delivering the supply of previously heap leached ore, including the remaining portion of dissolved metal trapped in the heap leached ore, into the tank through the inlet in the top portion of the tank, the previously heap leached ore being introduced into the tank distal from the outlet of the bottom portion of the tank;

disrupting a downward flow path of the previously heap leached ore through the tank;

washing the remaining portion of dissolved metal trapped in the heap leached ore with the water to produce a pregnant solution, the pregnant solution, the water and a previously heap leached or admixture traveling downwardly in a direction generally from the top portion of the tank toward the bottom portion of the tank during said washing;

ejecting the pregnant solution, the water and the previously heap leached ore admixture from the tank via the outlet in the bottom portion of the tank;

transporting the pregnant solution, the water and the previously heap leached ore admixture from the tank to a location apart from the tank; and separating the at least a portion of the remaining portion of dissolved metal trapped in the heap leached ore from the pregnant solution.

2. The method of claim 1 comprising:
recycling the pregnant solution, and
delivering the pregnant solution for recycling into the tank through the inlet in the top portion of the tank distal from the outlet of the bottom portion of the tank.

3. The method of claim 2 wherein the pregnant solution for recycling is delivered at a first location distal from a second location where the water adapted to wash at least a portion of the remaining portion of dissolved metal trapped in the heap leached ore, the water being substantially void of ore, is delivered into the tank.

4. The method of claim 1 comprising injecting air into the pregnant solution during the transporting step to increase velocity and turbulence, further washing the remaining portion of dissolved metal trapped in the heap leached ore with the water to further remove the at least a portion of the remaining portion of dissolved metal trapped in the heap leached ore.

5. The method of claim 4 wherein during the transporting step, the pregnant solution is moved generally vertically in a pipe so that the pregnant solution moves upward against gravity, sloshing within the pipe to even further wash the remaining portion of dissolved metal trapped in the heap leached ore to even further remove the at least a portion of the remaining portion of dissolved metal trapped in the heap leached ore.

6. The method of claim 1 wherein the tank includes an overflow weir, wherein excess water near the inlet exits the tank via the weir.

7. The method of claim 1 comprising leaching in an ore heap the ore with a first process fluid so that a substantial portion of metal in the ore is leached from the ore, but a remaining portion of dissolved metal remains trapped in the ore, before said providing a supply of previously heap leached ore step, wherein the water primarily washes from the surfaces of the ore the remaining portion of dissolved metal without substantially chemically extracting the remaining portion of dissolved metal in the washing step.

8. A method of recovering additional metals from ore that has previously undergone heap leaching, the method comprising:

providing a supply of heap leached ore containing moisture, the heap leached ore having previously undergone heap leaching, where the heap leaching having removed a first portion of dissolved metal from the heap leached ore, with a second portion of dissolved metal remaining associated with the heap leached ore;

delivering with a delivery device the supply of heap leached ore to a tank having an upper portion and a lower portion, the supply of heap leached ore entering the tank through an inlet in the upper portion;

delivering water to the tank through the inlet located in the upper portion of the tank;

distributing the supply of heap leached ore in the water within the tank so that the water washes the heap leached ore to remove a third portion of dissolved metal, from the second portion of dissolved metal remaining associated with the heap leached ore in the tank, the third portion of dissolved metal mixing with the water to create a pregnant solution, the pregnant solution traveling downwardly in a direction generally from the top portion of the tank toward the bottom portion of the tank during said distributing;

disrupting the flow of heap leached ore through the tank to increase the residence time of the heap leached ore in the tank so that the water further removes the third portion of dissolved metal from the heap leached ore;

discharging the pregnant solution from the lower portion of the tank;

transporting the pregnant solution to a separating device; and separating at least the third portion of dissolved metal from the pregnant solution with the separating device, whereby the separated third portion of dissolved metal increases the total dissolved metals recovered from the supply of heap leached ore that previously underwent heap leaching.

9. The method of claim 8, wherein said transporting step includes moving the pregnant solution generally vertically in a pipe so that the pregnant solution moves upward, generally vertically against gravity in a conduit, sloshing the pregnant solution within the conduit to further wash the third portion of dissolved metal from the heap leached ore.

10. The method of claim 8 wherein said transporting step includes creating turbulence to further wash the third portion of dissolved metal from the heap leached ore.

11. The method of claim 8 comprising injecting air into the pregnant solution during the transporting step to increase velocity and turbulence, further washing the third portion of dissolved metal from the heap leached ore.

12. The method of claim 8 wherein the disrupting step includes disrupting a downward flow path of the heap leached ore and water through the tank with an agitator.

13. The method of claim 8 comprising:
recycling the pregnant solution through the tank; and
delivering the pregnant solution for recycling into the tank through the inlet in the top portion of the tank distal from the outlet of the bottom portion of the tank.

14. The method of claim 13 comprising injecting air into the pregnant solution during the transporting step to increase velocity and turbulence, further washing the third portion of dissolved metal from the heap leached ore.

15. The method of claim 13 wherein the pregnant solution for recycling are delivered in the inlet of the tank at a location above an overflow weir located in the tank.

16. The method of claim 8 comprising heap leaching ore to remove the first portion of dissolved metal from the heap leached ore, with the second portion of dissolved metal remaining associated with the heap leached ore.

17. The method of claim 16 comprising delivering the pregnant solution through the top portion of the tank to recycle the pregnant solution through the tank, in addition to adding additional water to the top portion of the tank.

18. The method of claim 8 comprising leaching, in an ore heap the ore with a first process fluid so that a substantial portion of metal in the ore is leached from the ore, but a remaining portion of dissolved metal remains trapped in the ore, before said providing a supply of previously heap leached ore step, wherein the water primarily washes from the surfaces of the ore the remaining portion of dissolved metal without substantially chemically extracting the remaining portion of dissolved metal in the washing step.

\* \* \* \* \*